(12) United States Patent
McMurtry et al.

(10) Patent No.: US 7,659,992 B2
(45) Date of Patent: Feb. 9, 2010

(54) SCALE READING APPARATUS

(75) Inventors: David Roberts McMurtry, Dursley (GB); James Reynolds Henshaw, Stroud (GB)

(73) Assignee: Renishaw PLC, Wotton-under-Edge (GB)

( * ) Notice: Subject to any disclaimer, the term of this patent is extended or adjusted under 35 U.S.C. 154(b) by 0 days.

(21) Appl. No.: 11/629,853

(22) PCT Filed: Jun. 21, 2005

(86) PCT No.: PCT/GB2005/002421

§ 371 (c)(1),
(2), (4) Date: Dec. 18, 2006

(87) PCT Pub. No.: WO2005/124282

PCT Pub. Date: Dec. 29, 2005

(65) Prior Publication Data

US 2008/0013105 A1    Jan. 17, 2008

(30) Foreign Application Priority Data

Jun. 21, 2004  (GB) ................. 0413710.5

(51) Int. Cl.
*G01B 11/02* (2006.01)
(52) U.S. Cl. .................................................. 356/499
(58) Field of Classification Search ............... 356/496, 356/497, 499, 521; 250/237 G
See application file for complete search history.

(56) References Cited

U.S. PATENT DOCUMENTS

| 5,390,022 | A | * | 2/1995 | Ishizuka et al. | 356/499 |
| 5,539,519 | A | * | 7/1996 | Takagi et al. | 356/499 |
| 5,574,559 | A | * | 11/1996 | Kaneda et al. | 356/499 |
| 6,198,534 | B1 | | 3/2001 | Hofer et al. | |
| 2003/0047674 | A1 | | 3/2003 | Thornburn et al. | |
| 2004/0036016 | A1 | | 2/2004 | Homer et al. | |

FOREIGN PATENT DOCUMENTS

| EP | 0 207 121 B1 | 1/1990 |
| EP | 1 099 936 A1 | 5/2001 |
| WO | WO 02/065061 A1 | 8/2002 |
| WO | WO 2002/084223 A1 | 10/2002 |

* cited by examiner

*Primary Examiner*—Michael A Lyons
(74) *Attorney, Agent, or Firm*—Oliff & Berridge, PLLC

(57) ABSTRACT

Apparatus for measuring displacement between two members. A scale is provided on one member and has an incremental pattern with at least one reference mark embedded in it. A read head is provided on the other member and comprises a periodic diffraction means for interacting with a light pattern modulated by the incremental pattern on the scale to produce interference fringes having movement relative to said readhead responsive to said displacement, first detecting means for detecting the movement of the interference fringes, imaging means for imaging the reference mark and second detecting means for detecting the image of the reference mark.

13 Claims, 4 Drawing Sheets

SCALE READING APPARATUS

The present invention relates to optical scale reading apparatus comprising a scale and a readhead movable relative to the scale. In particular the invention relates to an incremental scale having embedded reference marks, and a readhead for that scale.

A known form of scale reading apparatus for measuring relative displacement of two members comprises a scale on one of the members having scale marks defining a pattern and a readhead provided on the other member. An incremental scale has scale marks defining a periodic pattern which generates a periodic signal at the readhead when relative movement between the scale and the readhead takes place. These periodic signals produce an up/down count which enables displacement between the scale and the readhead to be determined.

Our earlier European Patent No. 207121 describes an incremental scale reading system which has a filtering effect so that the signal produced at the photodetector array is largely immune to parts of the scale being obscured for example by contamination.

Measurement scales may have reference marks which when detected by the readhead enable the exact position of the readhead to be determined. Reference marks may for example enable the accuracy of the incremental count to be verified.

Reference marks are typically provided on a scale track parallel to the incremental track. This has the disadvantage that it increases the width of the scale.

Furthermore, it has the disadvantage that yawing of the readhead can cause errors in the position of the reference mark relative to the incremental scale as detected by the readhead.

As separate optics are used for detecting the light pattern produced from the incremental scale and the reference mark, thermal longitudinal expansion of the readhead can also cause errors in the relative positions of the reference mark and incremental scale as detected by the readhead.

The present invention provides apparatus for measuring displacement between two members, comprising:
- a scale on one of the members having periodic scale markings forming an incremental pattern and at least one reference mark embedded in the incremental pattern;
- a read head provided on the other member;
- periodic diffraction means provided in the readhead for interacting with a light pattern modulated by the incremental pattern on the scale to produce interference fringes having movement relative to said readhead responsive to said displacement;
- first detecting means for detecting said movement of said interference fringes;
- imaging means provided in the readhead for imaging the reference mark;
- second detecting means for detecting said image of the reference mark;
- wherein the imaging means is located between the scale and the second detecting means.

The periodic diffraction means and the imaging means may be provided on a single unit.

The imaging means may comprise a lens, for example a cylindrical lens. The imaging means may comprise a Fresnel zone plate. The imaging means may be at least partially incorporated within the periodic diffraction means. A masking region may be provided between the imaging means and the periodic diffraction means.

The first and second detecting means may be provided at a single detecting unit. The second detecting means may be at least partly incorporated within the first detecting means.

A single light source may be used for the incremental pattern and the reference mark.

The imaging means, periodic diffraction means, first and second detecting means and light source may be disposed in a single plane. The plane may be perpendicular to the direction of the scale.

The invention will now be described with reference to the accompanying drawings in which.

Figure 1:
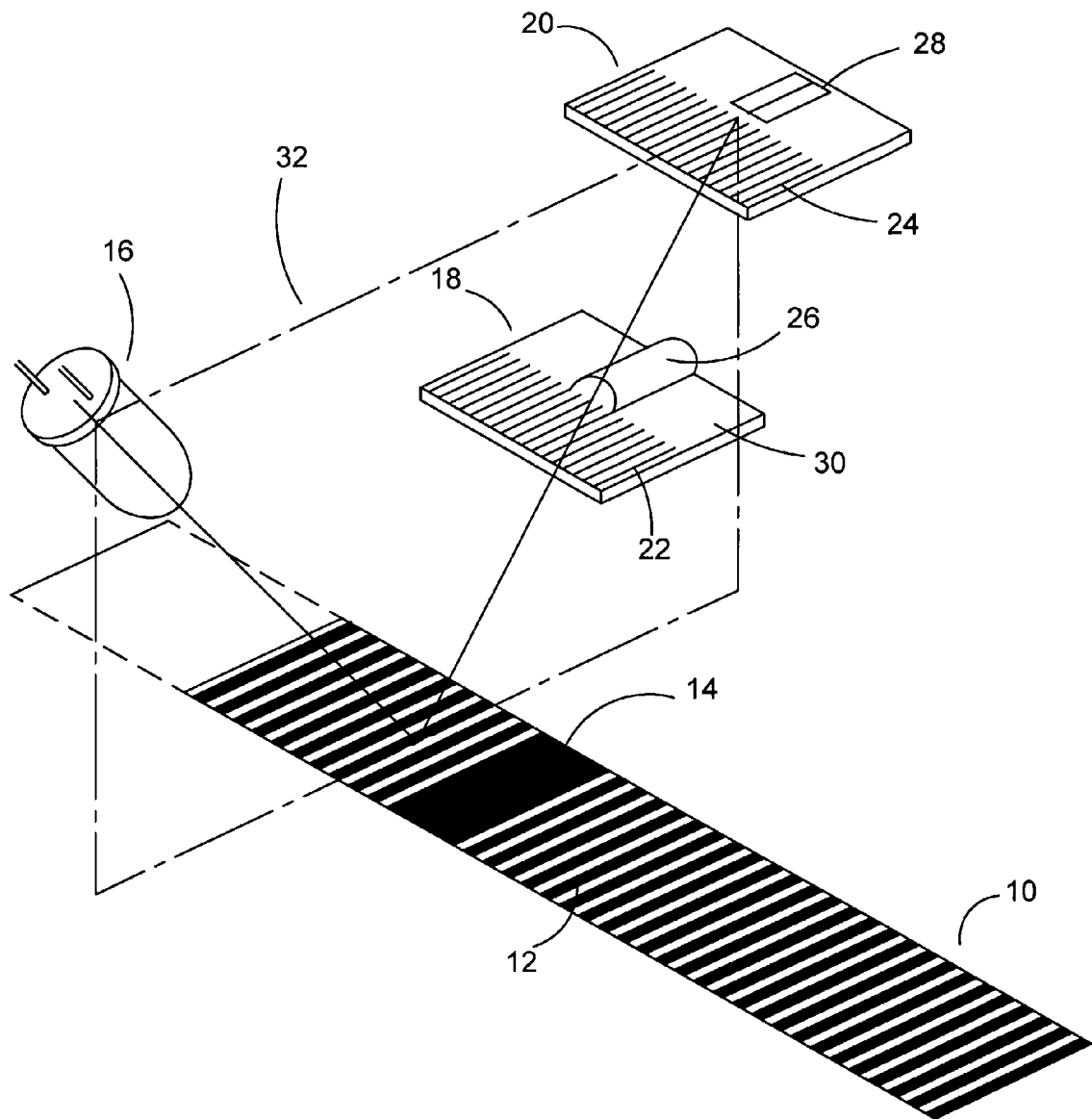
FIG. 1 is a perspective view of the scale reading apparatus.

FIG. 1 illustrates a first embodiment of the present invention. A scale 10 has periodic markings 12 made up of alternate reflective and non-reflective lines which form the incremental scale. A reference mark 14 is embedded in the scale by the removal or addition of lines, thus forming a reflective mark.

A readhead (not shown) is movable relative to the scale and contains optics which comprise a light source 16, an optical element 18 and a detector unit 20. The light source 16 is directed towards the scale to illuminate the scale and produce a periodic light pattern from the incremental scale. The optical element 18 has an index grating 22 which interacts with the periodic light pattern to form interference fringes at the detector unit 20. The detector unit 20 has a photodetector array 24 which detects these interference fringes to produce a periodic signal. Movement of the readhead relative to the scale causes movement of the interference fringes relative to this detector portion 24 thus producing an up/down count which enables a measurement of displacement.

A scale and readhead of this type are described in our earlier European Patent No. 207121. This arrangement has the advantage that due to a filtering effect of the optics, it is largely immune to the addition or removal of bits of the scale at the reference mark. Thus the readhead can pass over the reference mark with just a slight reduction in the signal to noise ratio. In this type of arrangement, the index grating 22 is positioned between the scale 10 and detector 22. In this arrangement the scale 10 acts as an object which is imaged by the index grating 22. This arrangement allows the reference mark to be embedded in the incremental scale without significant loss of signal. In addition, this arrangement allows the imaging optics 18 to be located between the scale 10 and detector without significant loss of signal. In known alternative arrangements in which the index grating is positioned between the light source and scale, the index grating acts as the object and is imaged by the scale. In this case, placement of a reference mark in the scale or placing imaging optics between the scale and detector has a more significant effect on the signal to noise ratio.

The reference mark may be formed by the removal of lines or the addition of lines. Alternatively it may comprise any pattern which can be differentiated from the incremental scale. For example, the reference mark may comprise an autocorrelator in which the reference mark forms a pattern interlaced with the incremental scale and a matching mask is provided in the readhead, for example as described in International Patent Application WO02/065061.

Figure 2:
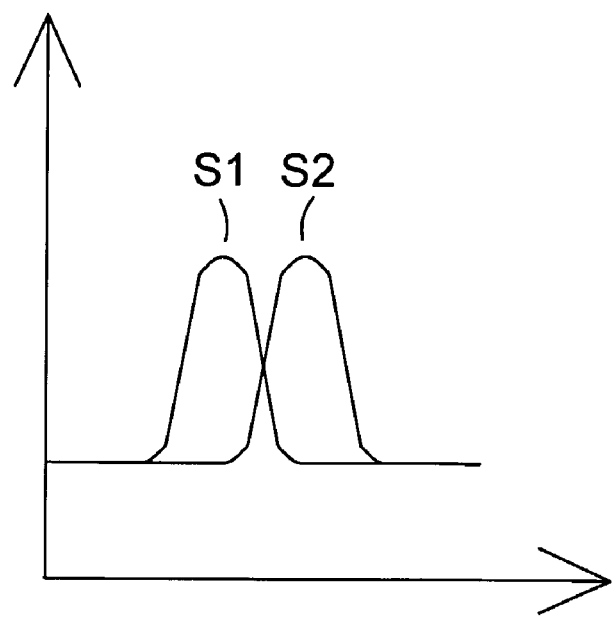
FIG. 2 is a graph representing the output signals from the split detector of FIG. 1.
Figure 3:
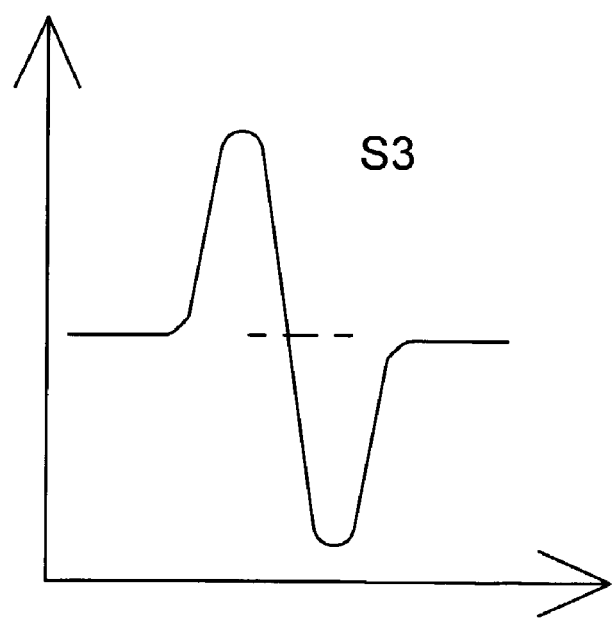
FIG. 3 is a graph representing the difference between the output signals of FIG. 2.

When the readhead passes over the reference mark 14 a change in the intensity of light reflected by the scale 10 is imaged by a lens 26 in the optical element 18 onto the detector 20. The detector 20 has a split detector 28 onto which light from the reference mark 14 is imaged. FIG. 2 illustrates the outputs from the two halves of the split detector 28 as the readhead moves along the scale. Signals S1 and S2 from the two halves of the split detector are subtracted to form signal S3 shown in FIG. 3. The position of the reference mark is typically where the falling edge of signal S3 crosses a known threshold in the reading direction shown.

Although in this embodiment a split detector is used to detect the reference mark, other types of detector may be used, for example the outputs from three detector elements could be combined. A multi-role detector element may be used to detect both the incremental and reference mark signals.

The lens 26 illustrated in FIG. 1 is a cylindrical lens mounted on a plate 30. However other types of lens having the same optical function may be used, for example a spherical lens, a linear microlens array or a Fresnel zone plate. The lens may be mounted on the plate 30 by any suitable fashion, e.g. gluing or moulding. The lens 26 does not need to be integral with the optical element 18 which holds the index grating 22.

The arrangement shown in FIG. 1 still works when a focal centre of the lens is not level with the index grating.

Various different arrangements of the optical element and detector are possible, for example the positions of the incremental related portions and the reference mark related portions of the optical element and/or detector may be interchanged.

Figure 4:
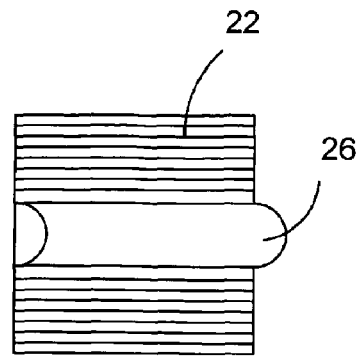
FIG. 4 illustrates a plan view of the optical element of a second embodiment of the invention.
Figure 5:
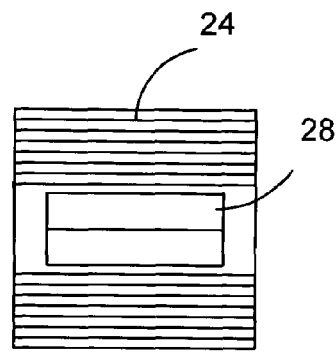
FIG. 5 illustrates a plan view of the detector of a second embodiment of the invention.

FIGS. 4 and 5 illustrate the optical element and detector respectively in which the incremental and reference mark optics are combined together. In FIG. 4 the lens 26 is placed within the index grating 22 and in FIG. 5 the split detector 28 is located within the incremental detecting elements 24.

Figure 6:
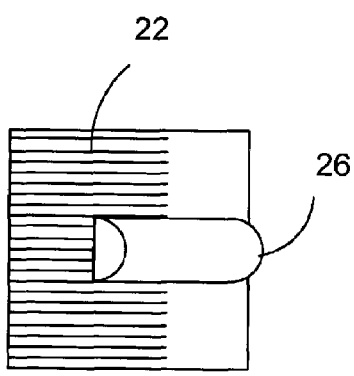
FIG. 6 illustrates a plan view of the optical element of a third embodiment of the invention.
Figure 7:
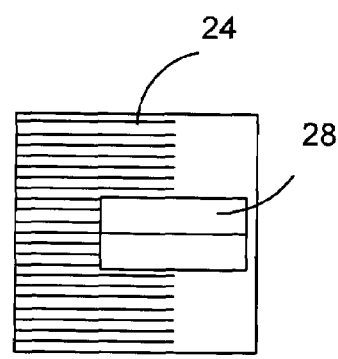
FIG. 7 illustrates a plan view of a detector according to a third embodiment of the invention.

Various degrees of intermingle of the reference mark with the incremental scale and their associated optics and detectors are possible. FIGS. 6 and 7 illustrate a further embodiment of the optical element and a detector respectively. FIG. 6 illustrates an optical element 18 in which the lens 26 extends partially into the index grating portion 22. FIG. 7 illustrates the associated detector with its reference mark detector 28 extending partially into the incremental detector portion 24.

The optical element may combine the incremental and reference mark optics, for example in a diffractive optical element (DOE), multi-level optics or a 3-dimensional optical component, such as a volume holograph etc. The lens may comprise many lens segments, for example a Fresnel lens.

Figure 8:
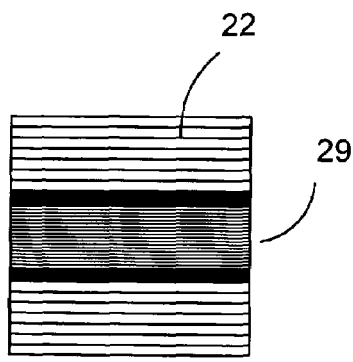
FIG. 8 illustrates a plan view of an optical element in which a Fresnel zone plate is incorporated within the index grating.

FIG. 8 illustrates an optical element, in which a Fresnel zone plate 29 is incorporated within the index grating 21. A mask region 31 may be provided on either side of the Fresnel zone plate to improve the system response. This masks stray light from the incremental scale from being detected by the reference mark detector. The mask region may be formed by chrome on glass or any other suitable means. Such a mask may be used with imaging means other than a Fresnel zone plate.

Alternatively, the imaging lens and diffraction grating may be located separately. They are not required to be in the same plane.

This region 31 could be left blank, allowing light to be transmitted without directing it to the reference mark detector.

Figure 9:
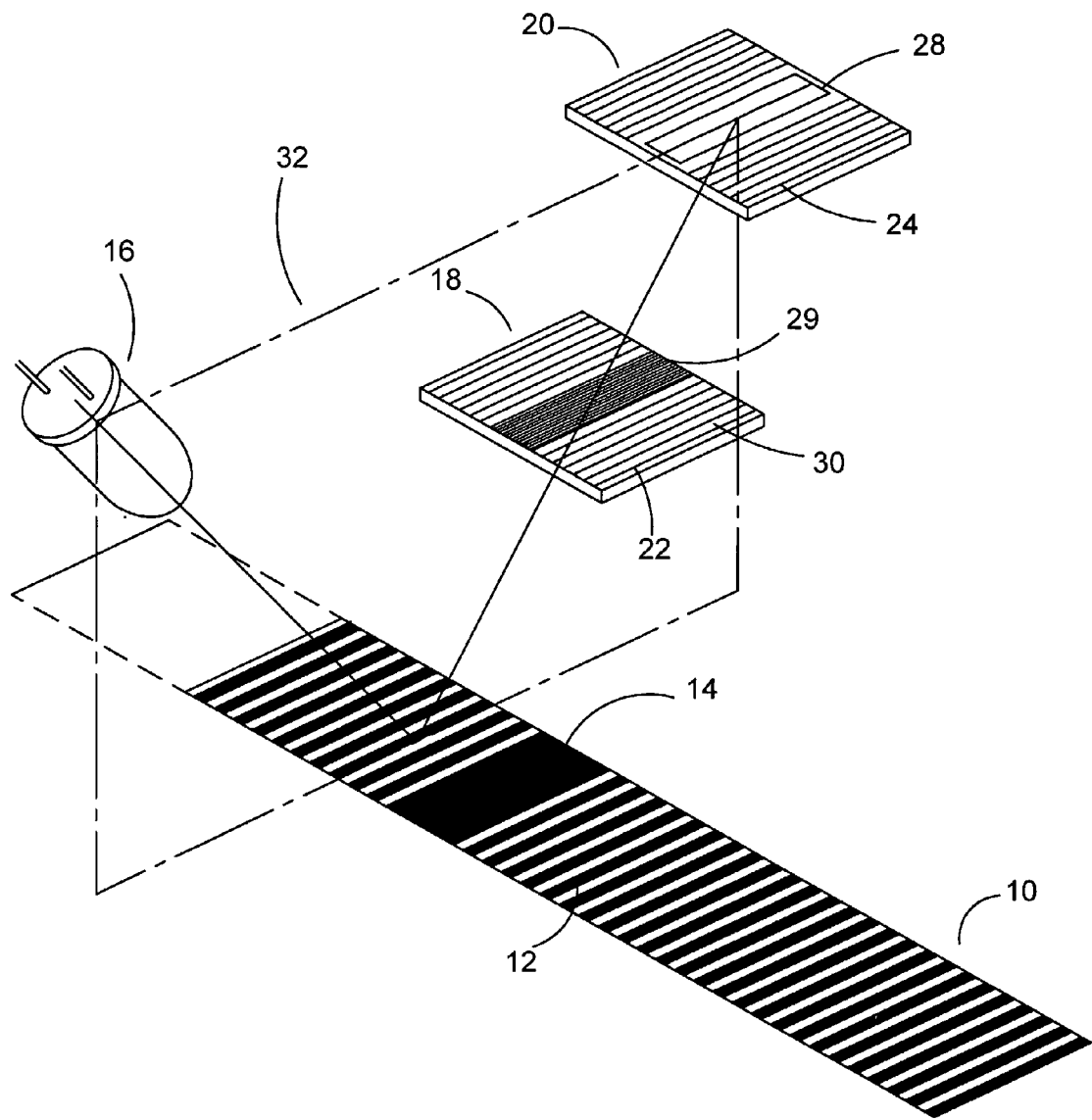
FIG. 9 is a perspective view of the scale reading apparatus of FIG. 1, having the detector of FIG. 5 and optical element of FIG. 8.

FIG. 9 illustrates an embodiment similar to that shown in FIG. 1 but having an optical element as illustrated in FIG. 8 (i.e. having Fresnel zone plate 29 incorporated within the index grating 21) and a detector as illustrated in FIG. 5 (i.e. in which the split detector 28 is located within the incremental detecting elements 24). In both the optical element and detector, the incremental and reference mark optics are combined.

Unwanted light may fall on the detectors, such as background unmodulated light and cross contamination of modulated light from the incremental/reference mark systems. Baffles can be used in the readhead to reduce this unwanted light. Furthermore cross contamination may be reduced by using different light sources of different wavelengths for the incremental and reference mark systems. Filters may be provided so that the reference mark portions and incremental portions of the detector only detect light of the specific wavelength used in that system.

However, a single light source has the advantage that the incremental and reference mark signals share the same age, temperature coefficient etc. Thus the phase of the incremental and reference mark signals are kept steady, reducing electronics and current consumption.

Furthermore, use of the same light source allows the signals from both systems to be compensated simultaneously using feedback from just one system.

This arrangement of scale and readhead has the advantage that the footprint on the scale of the incremental and reference marks is at a similar location on the scale and the light source, optical element and detector are in the same plane 32 (shown in FIG. 1) for both the incremental and reference mark systems. This arrangement has the benefit that there is reduced parallax and reduced sensitivity to yaw.

If the reference mark detector and incremental detector are on a single detector unit and the lens and index grating are on a single optical element, problems due to longitudinal expansion of the readhead are eliminated.

Although the described embodiment is a linear scale reading system, this invention is also suitable for a rotary system or a two-dimensional system.

The invention claimed is:

1. Apparatus for measuring displacement between two members, comprising:
   a scale on one of the members having periodic scale markings forming an incremental pattern and at least one reference mark embedded in the incremental pattern;
   a readhead provided on the other member;
   periodic diffraction means provided in the readhead for interacting with a light pattern modulated by the incremental pattern on the scale to produce interference fringes having movement relative to said readhead responsive to said displacement;
   first detecting means for detecting said movement of said interference fringes;
   non-collimating imaging means provided in the readhead for imaging the reference mark;
   second detecting means for detecting said image of the reference mark;

wherein the imaging means is located between the scale and the second detecting means.

2. Apparatus according to claim 1 wherein the periodic diffraction means and the imaging means are provided on a single unit.

3. Apparatus according to claim 2 wherein the imaging means is at least partially incorporated within the periodic diffraction means.

4. Apparatus according to claim 2 wherein a masking region is provided between the imaging means and the periodic diffraction means.

5. Apparatus according to claim 1 wherein the imaging means comprises a lens.

6. Apparatus according to claim 5 wherein the lens comprises a cylindrical lens.

7. Apparatus according to claim 1 wherein the imaging means comprises a Fresnel zone plate.

8. Apparatus according to claim 1 wherein the first and second detecting means are provided on a single detecting unit.

9. Apparatus according to claim 8 wherein the second detecting means is at least partly incorporated within the first detecting means.

10. Apparatus according to claim 1 wherein a single light source is used for the incremental pattern and the reference mark.

11. Apparatus according to claim 1 wherein the imaging means, periodic diffraction means, first and second detecting means and a light source are disposed in a single plane.

12. Apparatus according to claim 11 wherein the plane is perpendicular to the direction of the scale.

13. Apparatus for measuring displacement between two members, comprising:
   a scale on one of the members having periodic scale markings forming an incremental pattern and at least one reference mark embedded in the incremental pattern;
   a readhead provided on the other member;
   a diffraction grating provided in the readhead for interacting with a light pattern modulated by the incremental pattern on the scale to produce interference fringes having movement relative to said readhead responsive to said displacement;
   a first detector for detecting said movement of said interference fringes;
   a non-collimating imager provided in the readhead that images the reference mark;
   a second detector that detects the image of the reference mark;
   wherein the imager is located between the scale and the second detector.

* * * * *